(12) United States Patent
Li et al.

(10) Patent No.: US 8,520,262 B2
(45) Date of Patent: Aug. 27, 2013

(54) POST COLOR CONVERSION MECHANISM FOR GRAY/BLACK TEXT AND GRAPHICS OBJECTS

(75) Inventors: Hong Li, Superior, CO (US); Randell Rivadeneira, Broomfield, CO (US); Vladimir V. Shestak, Boulder, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 413 days.

(21) Appl. No.: 12/619,861

(22) Filed: Nov. 17, 2009

(65) Prior Publication Data
US 2011/0116138 A1    May 19, 2011

(51) Int. Cl.
G06K 15/02 (2006.01)
H04N 1/40 (2006.01)
G06T 7/00 (2006.01)

(52) U.S. Cl.
USPC ........... 358/3.24; 358/2.1; 358/3.01; 358/1.9; 382/180

(58) Field of Classification Search
None
See application file for complete search history.

(56) References Cited

U.S. PATENT DOCUMENTS

| | | | |
|---|---|---|---|
| 5,999,703 A | 12/1999 | Schwartz et al. | |
| 6,084,604 A | 7/2000 | Moriyama et al. | |
| 6,222,639 B1 | 4/2001 | Suzuki | |
| 6,519,362 B1 | 2/2003 | Cusmariu | |
| 6,804,016 B2 * | 10/2004 | Hashimoto et al. | 358/1.13 |
| 6,840,599 B1 | 1/2005 | Cho | |
| 6,856,428 B1 * | 2/2005 | Lermant et al. | 358/1.9 |
| 6,909,803 B2 | 6/2005 | Uchida | |
| 7,019,868 B2 * | 3/2006 | Chang et al. | 358/2.1 |
| 7,036,907 B2 * | 5/2006 | Jung et al. | 347/43 |
| 7,443,521 B2 | 10/2008 | Saito et al. | |
| 2003/0202193 A1 * | 10/2003 | Yokochi | 358/1.9 |
| 2004/0190019 A1 | 9/2004 | Li et al. | |
| 2006/0203270 A1 * | 9/2006 | Shirasawa | 358/1.9 |
| 2008/0174796 A1 | 7/2008 | Yoo | |

\* cited by examiner

*Primary Examiner* — Barbara Reinier
(74) *Attorney, Agent, or Firm* — Blakely, Sokoloff, Taylor & Zafman LLP

(57) ABSTRACT

A method is disclosed. The method includes receiving color data for an object to be printed and performing post color processing for each pixel in the object if the object is a graphics/text object, while no processing is performed if the object is an image object. Post color processing is performed by determining if a pixel is black or gray and converting the pixel to K only black color if the pixel is black or gray.

13 Claims, 4 Drawing Sheets

POST COLOR CONVERSION MECHANISM FOR GRAY/BLACK TEXT AND GRAPHICS OBJECTS

FIELD OF THE INVENTION

This invention relates generally to the field of printing systems. More particularly, the invention relates to managing and controlling ink usage in a color printing system.

BACKGROUND

Print systems include presentation architectures that are provided for representing documents in a data format that is independent of the methods that are utilized to capture or create those documents. Examples of presentation systems include Portable Document Format (PDF) and PostScript (PS). According to these systems, documents may include mixed content data objects (e.g., combinations of text, image, graphics, etc.).

Further, these print systems perform color printing using a combination of cyan (C), magenta (M), yellow (Y) and black (K) color inks or toners. Typically, mixed content input color data objects received at a print system are rendered using all colorants. For example, black or gray text/graphics (e.g., non image object) and image objects are both processed and printed with CMYK.

While this results in desirable colors for image objects, black and gray text/graphics often includes undesirable CMYK black/gray combinations. Such combinations are undesirable because it results in substantial use of C, M and Y ink to print various shades of black and gray. Since C, M and Y ink or toners are each expensive, the unnecessary use of these colors results in wasted resources. Furthermore, black/gray text, and line art printed with all CMYK may not be appealing to customers especially when black text is printed.

Thus, a method that allows for rendering gray/black text and graphics objects using only K ink or toner is desired.

SUMMARY

In one embodiment, a method is disclosed. The method includes receiving color data for an object to be printed and performing post color processing for each pixel in the object if the object is a non-image object, while no processing is performed if the object is an image object. Post color processing is performed by determining if a pixel is black or gray and converting the pixel to K only black color if the pixel is black or gray.

In another embodiment, a printer is disclosed. The printer includes a control unit having a color management unit to perform color mapping and determine color intensities for each pixel in an object to be printed and a post color processing unit. The post color processing unit converts each pixel in the object to K only black color if the pixel is black or gray and leaves the pixel unchanged if the pixel is not black or gray.

BRIEF DESCRIPTION OF THE DRAWINGS

A better understanding of the present invention can be obtained from the following detailed description in conjunction with the following drawings, in which.

DETAILED DESCRIPTION

A mechanism to perform color conversion for black and gray non image object data is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
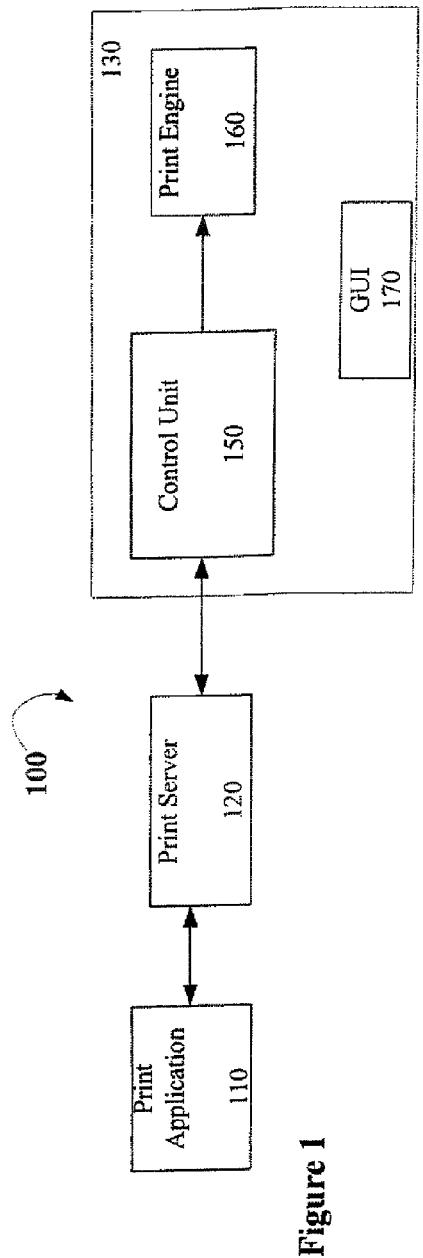
FIG. 1 illustrates one embodiment of a printing system.

FIG. 1 illustrates one embodiment of a printing system 100. Printing system 100 includes a print application 110, a server 120 and printer 130. Printer 130 includes a control unit 150 and a print engine 160. Print application 110 makes a request for the printing of a document. In one embodiment, print application 110 provides PostScript (PS) and PDF files for printing to print server 120.

Figure 2:
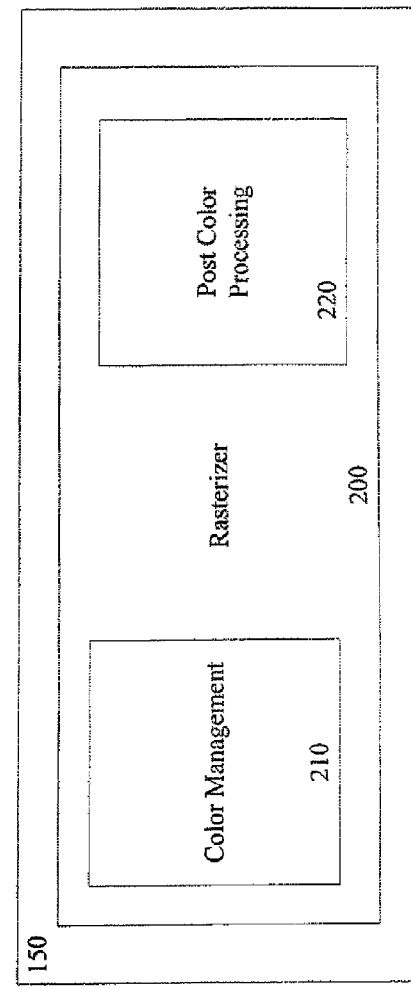
FIG. 2 illustrates one embodiment of a control unit.

According to one embodiment, control unit 150 processes and renders objects received from print server 120 and provides sheet maps for printing to print engine 160. FIG. 2 illustrates one embodiment of a control unit 150. Control unit 150 includes a rasterizer 200 having color management unit 210, post color processing unit 220, as well as other units that will not be described herein.

Rasterizer 200 is implemented to process image objects received at control unit 150 by performing a raster image process (RIP) to convert an image described in a vector graphics format (e.g., shapes) into a raster image (e.g., pixels) for output to print engine 160. Color management unit 210 provides a color mapping from a source to a destination color space.

In such an embodiment, color management unit 210 uses ICC profiles to perform the mapping to determine CMYK values for each pixel in a particular object to be printed at print engine 160. Post color processing unit 220 provides post color conversion for non image objects received from color management unit 210. However in other embodiments, post color processing unit 220 receives and performs post color conversion on received device input data.

According to one embodiment, post color processing unit 220 distinguishes between image and text/graphics objects to determine if post color conversion may be appropriate. If deemed appropriate, post color processing unit 220 converts black/gray text/graphics objects to K only ink, while leaving image and color text/graphics objects unchanged to be printed with all CMYK colors. Note that in other embodiments, the black/gray text/graphics objects may be converted to processed black/gray.

Figure 3:
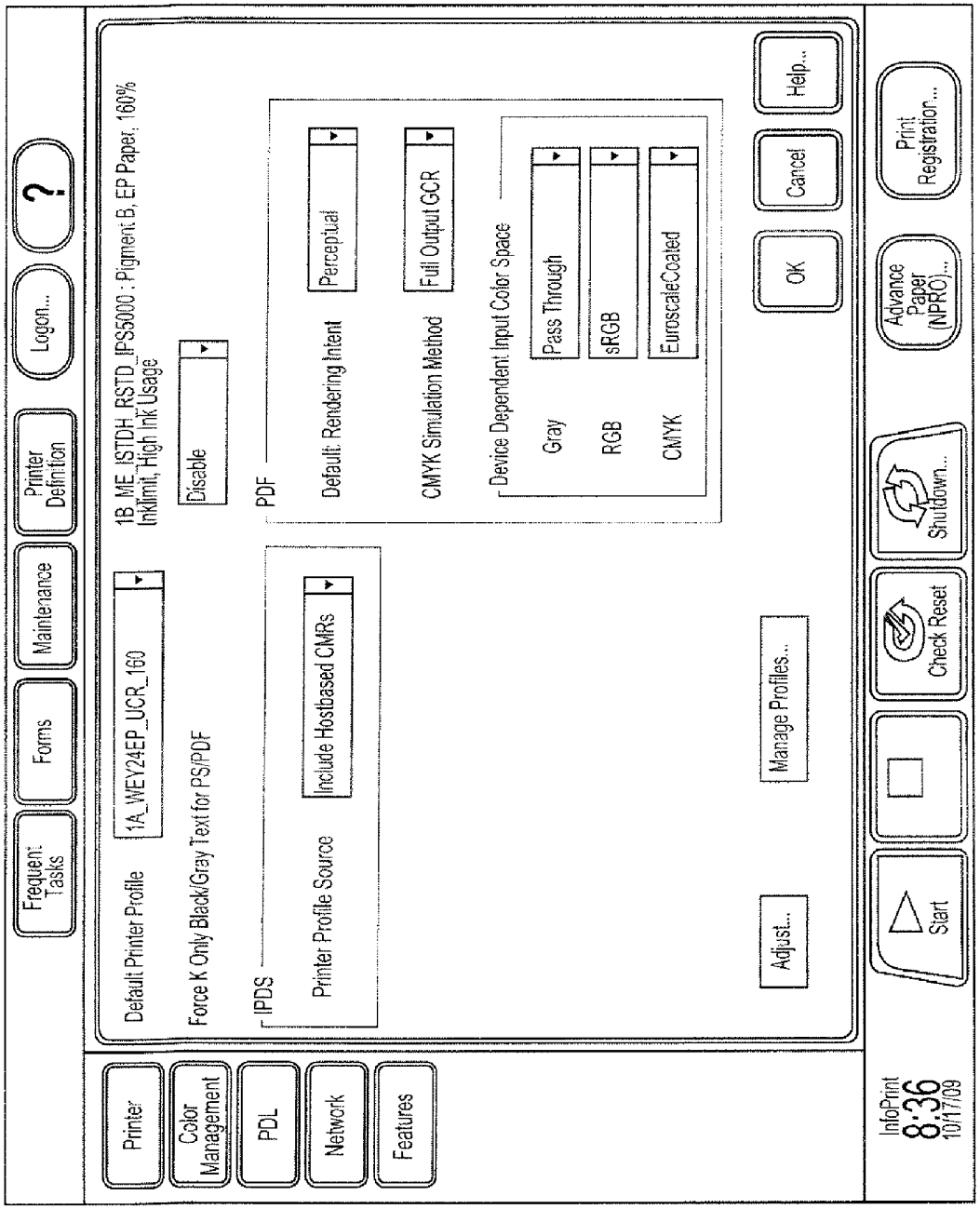
FIG. 3 illustrates an embodiment of a graphical user interface.

In one embodiment, post color conversion may be enabled or disabled by an operator at printer 130 using a Graphical User Interface (GUI) 170. FIG. 3 illustrates one embodiment of a screenshot of GUI 170 interface. Upon enabling post color conversion, an activation configuration value (color.textlinework.konly) is set to on. Once the configuration value is on, a black threshold value (color.textlinework.konly.kthreshold) and a gray threshold value (color.textlinework.konly.graythreshold) are read from a configuration file within printer 130 the printer's configuration.

The black and gray threshold values are each used to compare to post color conversion text/graphics object data, as discussed below. In one embodiment, the threshold values are set to a manufacturer default and may be modified by authorized operators. Thus, the range of gray/black may be changed without having to modify code at printer 130.

Figure 4:
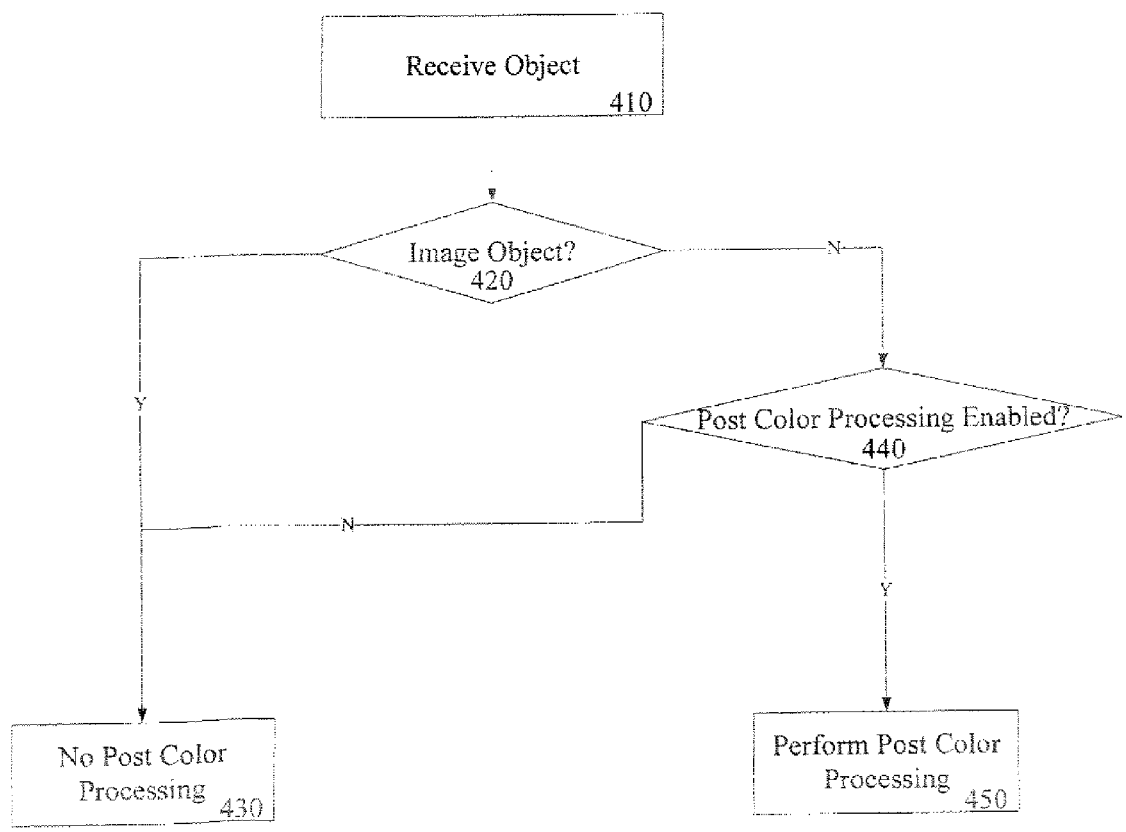
FIG. 4 is a flow diagram illustrating one embodiment of the operation of a color conversion mechanism.

FIG. 4 is a flow diagram illustrating one embodiment of the operation of a post color processing unit 220. At processing block 410, object data is received at post color processing unit 220 from color management unit 210 or from a device input. At decision block 420, it is determined whether the object is an image. If the object is an image, no post color processing is performed.

If the object is determined to be text/graphics object data, it is determined whether post color processing is enabled (e.g., color.textlinework.konly set to on), decision block 440. If post color processing is disabled no post color processing is performed, processing block 430. However, if enabled, post color processing is performed for each pixel in the object, processing block 450.

Figure 5:
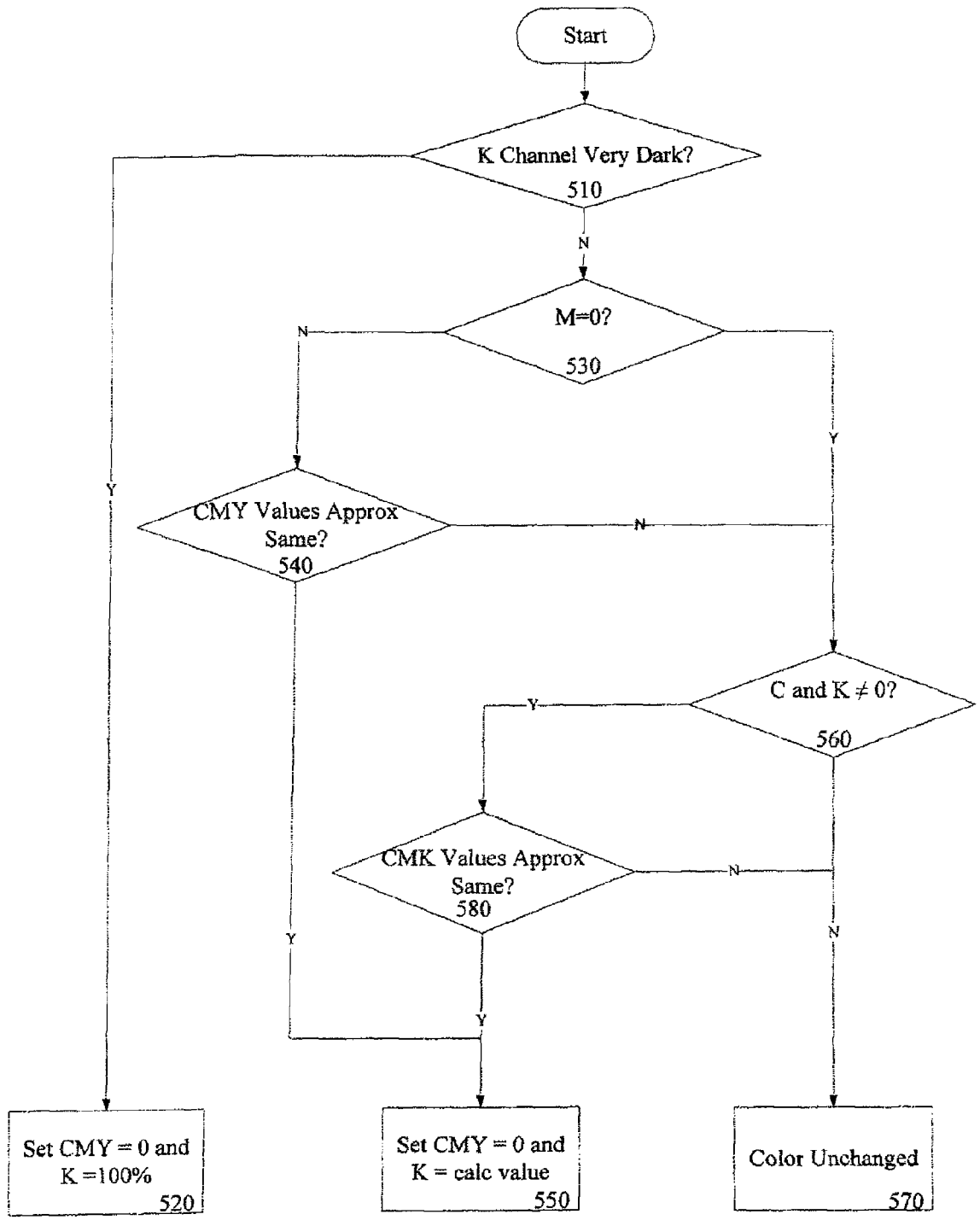
FIG. 5 is a flow diagram illustrating one embodiment for performing post color processing.

FIG. 5 is a flow diagram illustrating one embodiment for performing post color processing. At decision block 510, the K channel is examined to determine if the color of the pixel is very dark. In one embodiment, the darkness of the pixel is determined by comparing the K channel of the pixel to the black threshold value. If the pixel is very dark (e.g., K=color.textlinework.konly.kthreshold), the color is considered black. Thus, at processing block 520 the pixel is converted K only black. In such an embodiment, the CM&Y channels are set to 0, while the K channel is set to 100%.

However if the color of the pixel is not dark (e.g., K<color.textlinework.konly.kthreshold), it is further determined whether the M channel is equal to 0, decision block 530. If M ? 0, the difference between the values if the C, M and Y channels are compared to determine if the values are approximately the same, decision block 540. If the values are close, the color of the pixel can be considered gray or black and the pixel will be converted to K only.

According to one embodiment, decision block 540 is implemented by calculating values r1 and r2 and comparing each of those values to the gray threshold value. In such an embodiment, r1=|1−C/M| and r2=|1−Y/M|. If the C, M and Y values are approximately the same (e.g., r1 and r2<color.textlinework.konly.graythreshold), the CMY channels are set to 0, while the K channel is set to a calculated value, processing block 550. In one embodiment, this value is calculated as min(1, [0.3C+0.59M+0.11Y+K]).

If at decision block 540, the C, M and Y values are not approximately the same (e.g., r1 or r2=color.textlinework.konly.graythreshold), or at decision block 530 where M is determined to equal 0, it is determined whether C and K are each unequal to 0, decision block 560. If C and K each equal 0, no color conversion is performed. Thus, the color of the pixel remains unchanged, processing block 570.

However if C or K are unequal to 0, the difference between the values of the C, M and K channels are compared to determine if the values are approximately the same, decision block 580. If the C, M and K values are close, the color of the pixel can again be considered gray or black. This time, r3 and r4 values are calculated and compared to the gray threshold value.

In one embodiment, r3=|1−M/C| and r2=|1−C/K|. If the C, M and K values are approximately the same (e.g., r3 and r4<color.textlinework.konly.graythreshold), control is returned to processing block 550 where the CMY channels are set to 0 and the K channel is set to the value calculated above. Otherwise, control is returned to processing block 570 where the color of the pixel remains unchanged.

The above-described color conversion mechanism assists in preserving C, M and Y ink resources by converting black and gray non image objects to K only objects.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising:
receiving color data for an object to be printed;
performing post color processing for each pixel in the object upon a determination that the object is a non-image object by:
  determining if a pixel is black or gray by:
    comparing a black channel value for the pixel to a black threshold value; and
    converting the pixel to black only if the black channel value is greater than the black threshold value;
    determining if a magenta color value is equal to zero if the black channel value is less than the black threshold value;
    determining if a cyan color value, a yellow color value and the magenta color value are approximately equivalent if the magenta color value is unequal to zero; and
    converting the pixel to black only if the cyan, yellow and magenta color values are approximately equivalent; and
  converting the pixel to K only black color if the pixel is black or gray; and
printing the object in full color upon a determination that the object is an image object.

2. The method of claim 1 further comprising leaving the pixel unchanged if the pixel is not black or gray for non-image objects.

3. The method of claim 1 further comprising determining if post color processing has been enabled prior to performing post color processing.

4. The method of claim 1 further comprising:
determining if the cyan and black color values are each unequal to zero if the cyan, yellow and magenta color values are not approximately the same; and
leaving the pixel unchanged if the cyan and black color values each equal zero.

5. The method of claim 4 further comprising:
determining if the cyan, magenta and black color values are approximately equivalent if either of the cyan or black color values are unequal to zero; and
converting the pixel to black only if the cyan, magenta and black color values are approximately equivalent.

6. The method of claim 4 further comprising leaving the pixel unchanged if the cyan, magenta and black color values are not approximately equivalent.

7. A printer comprising:
a control unit having:
a color management unit to perform color mapping and determine color values for each pixel in an object to be printed; and
a post color processing unit to perform post color processing for each pixel in the object upon a determination that the object is a non-image object by determining if a pixel is black or gray by comparing a black channel value for the pixel to a black threshold value; converting the pixel to black only if the black channel value is greater than the black threshold value;
determining if a magenta color value is equal to zero if the black channel value is less than the black threshold value; determining if a cyan color value, a yellow color value and the magenta color value are approximately equivalent if the magenta color value is unequal to zero, converting the pixel to black only if the cyan, yellow and magenta color values are approximately equivalent, converting the pixel to K only black color if the pixel is black or gray and printing the object in full color upon a determination that the object is an image object.

8. The printer of claim 7 further comprising a graphical user interface to allow an operator to enable and disable the post color processing unit.

9. The printer of claim 7 wherein the post color processing unit further determines if the cyan and black color values are each unequal to zero if the cyan, yellow and magenta color values are not approximately the same; and leaves the pixel unchanged if the cyan and black color values each equal zero.

10. The printer of claim 9 wherein the post color processing unit further determines if the cyan, magenta and black color values are approximately equivalent if either of the cyan or black color values are unequal to zero and converts the pixel to black only if the cyan, magenta and black color values are approximately equivalent.

11. The printer of claim 10 wherein the post color processing unit leaves the pixel unchanged if the cyan, magenta and black color values are not approximately equivalent.

12. An article of manufacture comprising a non-transitory machine-readable medium including data that, when accessed by a machine, cause the machine to perform operations comprising:
receiving color data for an object to be printed;
performing post color processing for each pixel in the object upon a determination that the object is a non-image object by:
determining if a pixel is black or gray by:
comparing a black channel value for the pixel to a black threshold value; and
converting the pixel to black only if the black channel value is greater than the black threshold value;
determining if a magenta color value is equal to zero if the black channel value is less than the black threshold value;
determining if a cyan color value, a yellow color value and the magenta color value are approximately equivalent if the magenta color value is unequal to zero; and
converting the pixel to black only if the cyan, yellow and magenta color values are approximately equivalent; and
converting the pixel to K only black color if the pixel is black or gray; and
printing the PDL object in full color upon a determination that the object is an image object.

13. The article of manufacture of claim 12 wherein determining if pixel is black or gray comprises:
comparing a black channel value for the pixel to a black threshold value; and
converting the pixel to black only if the black channel value is greater than the black threshold value.

* * * * *